United States Patent Office 3,396,143
Patented Aug. 6, 1968

3,396,143
POLYETHYLENE STABILIZED WITH A SYNERGISTIC STABILIZER COMBINATION
Gordon C. Newland and John W. Tamblyn, Kingsport, Tenn., assignors to Eastman Kodak Company, Rochester, N.Y., a corporation of New Jersey
No Drawing. Filed Jan. 22, 1965, Ser. No. 427,476
5 Claims. (Cl. 260—41)

ABSTRACT OF THE DISCLOSURE

A UV stabilized white thermoplastic composition comprising polyethylene and a synergistic stabilizer combination consisting essentially of a pigmenting amount of $TiO_2$ and 0.1–1.0% of 4,4' - bis(2,6-di-t.-butyl-phenol), 2,2' - methylene - bis[6-(1-methylcyclohexyl)-p-cresol], or zinc N,N-di($C_1$–$C_{20}$ alkyl) dithiocarbamate.

---

This invention resides in the chemical arts. It relates to synthetic resins and to the problem of inhibiting their deterioration under ultraviolet light.

Normally solid polymers of 1-olefins, such as normally solid polyethylene and crystalline polypropylene, are thermoplastic, synthetic resins which have gained widespread use as materials of construction. However, as is well known, normally solid, 1-olefin resins undergo photochemical degradation when exposed to ultraviolet light. This effect is frequently termed weathering. It appears to be a photooxidation process which causes rupture of the polymer chains and formation of carbonyl ($=C=O$) groups. As this degradation progresses, articles manufactured from 1-olefin resins tend to crack, become brittle and lose tensile strength to the extent of mechanical failure.

White plastic compositions are often wanted. Such compositions are normally made by incoroporating a white pigment such as finely divided titanium dioxide, finely divided zinc oxide and the like into plastics by conventional mixing procedures. Unfortunately, these pigments offer very little protection against ultraviolet light degradation. Indeed, when finely divided titanium dioxide, for example, is incorporated into polyethylene, the result is an acceleration of ultraviolet light degradation.

This invention is based upon the discovery that certain mixtures of finely divided titanium dioxide and specific organic compounds, when incorporated into particular 1-olefin resins, not only enhance the weatherability of these resins, but do so synergistically.

In summary, this invention comprises a normally solid, white, thermoplastic composition consisting essentially of (A) normally solid, 1-olefin resin selected from the group consisting of normally solid polyethylene, normally solid polypropylene and normally solid copolymer of propylene and 1-butene, (B) finely divided titanium dioxide at a concentration sufficient to substantially pigment said 1-olefin resin and (C), when said 1-olefin resin is normally solid polyethyene, 0.1–1% by weight of said resin of material selected from the group consisting of 4,4'-bis-(2,6 - di - t - butylphenol), 2,2'-methylenebis[6-(1-methylcyclohexyl) - p - cresol] and zinc N,N-di($C_1$–$C_{20}$ alkyl) dithiocarbamate, when said 1-olefin resin is normally solid polypropylene, 0.1–1% by weight of said resin of material consiting essentially of p-t-butylphenol and, when said 1-olefin resin is normally solid copolymer of propylene and 1-butene, 0.1–1% by weight of said resin of material selected from the group consisting of p-t-butylphenol, 2,2' - methylenebis[6 - (1 - methylcyclohexyl)-p-cresol], zinc N,N-di($C_1$–$C_{20}$ alkyl)dithiocarbamate, 4,4' - bis(2,6-di-t-butylphenol), 4,4'-butylidene(6-t - butyl-m-cresol), 4,4'-thiobis(6-t-butyl-m-cresol) and N,N-diphenyl-p-phenylenediamine.

Normally solid polyethylene, normally solid polypropylene and normally solid copolymer of propylene and 1-butene are well known 1-olefin resins and, therefore, need not be further described herein.

Titanium dioxide is a well known white pigment. In general, it is a finely divided solid commercially available in at least two crystalline forms, the anatase and rutile forms. The concepts of this invention include both forms. A concentration of finely divided titanum dioxide in the composition of this invention generally of about 0.25–10% by weight of the 1-olefin resin is usually sufficient to substantially pigment it.

The remaining components of the basic composition of this invention are well known compounds and, therefore, need not be further described herein.

The normally solid, thermoplastic composition of this invention can also comprise other additives such as, for example, antioxidants, heat stabilizers, additional ultraviolet light inhibitors, anticorrosion additives, antistatic agents, foaming agents, plasticizers, waxes, mold release agents, slip agents, anti-blocking agents, fillers, extenders and the like, including physical property improvers other than polymeric compounds.

The plastic composition of this invention is made by incorporating the components thereof into the 1-olefin resin. Generally such incorporation is performed by any one of a number of well known methods, such as roll compounding, extrusion, solvent mixing and the like. For example, such incorporation can be performed by heating or otherwise softening the 1-olefin resin to a workable consistency and then working in as by roll compounding until a substantially uniform mixture or dispersion is obtained.

The resulting plastic composition of this invention is then usually formed into articles such as pellets, sheeting, films, bars, tubes, filaments, specially shaped articles and the like as by conventional casting and molding techniques which include extrusion, compression molding, blow molding and the like.

This invention is further illustrated by the following examples of various aspects thereof including specific embodiments. Unless otherwise indicated this invention is not limited to these specific embodiments.

EXAMPLES 1–3

These examples illustrate specific embodiments of a white polyethylene composition according to this invention.

These specific embodiments are formulated as follows:

| Components | Concentration in Parts by Wt. | | |
|---|---|---|---|
| | Ex. 1 | Ex. 2 | Ex. 3 |
| Normally solid polyethylene | 100 | 100 | 100 |
| Finely divided titanium dioxide | 5 | 5 | 5 |
| 4,4'-bis(2,6-di-t-butylphenol) | 0.5 | | |
| 2,2'-methylenebis[6-(1-methylcyclohexyl)-p-cresol] | | 0.5 | |
| Zinc N,N-dibutyldithiocarbamate | | | 0.5 |

These specific embodiments are made by mixing together for 4 minutes the components on hot compounding rolls, the front roll being at 270° F. and the rear roll being at 220° F.

The composition thus obtained in each case is a white plastic composition having a high degree of ultraviolet light stability and useful in shaped articles and the like, which are likely to be exposed to ultraviolet light.

EXAMPLE 4

This example illustrates a specific embodiment of a white polypropylene composition according to this invention.

This specific embodiment is formulated as follows:

| Components: | Concentration in parts by wt. |
|---|---|
| Normally solid polypropylene | 100 |
| Finely divided titanium dioxide | 1.5 |
| p-t-Butylphenol | 1.5 |

This specific embodiment is made by admixing the components for 5 minutes in a C. W. Brabender Plastograph.

The resulting product is a white plastic composition suitable for use in shaped articles likely to be exposed to ultraviolet light.

EXAMPLES 5–12

These examples illustrate specific embodiments of a composition according to this invention, wherein the 1-olefin resin is a copolymer of propylene and 1-butene. These examples are formulated as follows:

| Components | Concentration in Parts by Wt. | | | | | | | |
|---|---|---|---|---|---|---|---|---|
| | Ex. 5 | Ex. 6 | Ex. 7 | Ex. 8 | Ex. 9 | Ex. 10 | Ex. 11 | Ex. 12 |
| Normally solid copolymer of propylene and 1-butene, the weight ratio of propylene to 1-butene being 80:20 | 100 | 100 | 100 | 100 | 100 | 100 | 100 | 100 |
| Titanium dioxide | 5 | 5 | 5 | 5 | 5 | 5 | 5 | 5 |
| p-t-Butylphenol | 0.5 | 1.5 | | | | | | |
| 2,2'-methylenebis[6-(1-methylcyclohexyl)-p-cresol] | | | 0.5 | | | | | |
| Zinc N-N-dibutyldithiocarbamate | | | | 0.5 | | | | |
| 4,4'-bis(2,6-di-t-butylphenol) | | | | | 0.5 | | | |
| 4,4'-butylidene(6-t-butyl-m-cresol) | | | | | | 0.5 | | |
| 4,4'-thiobis(6-t-butyl-m-cresol) | | | | | | | 0.5 | |
| N,N-diphenyl-p-phenylenediamine | | | | | | | | 0.5 |

These specific embodiments are made by admixing for 4 minutes the components on hot compounding rolls, the front roll being at 320° F. and the rear roll at 285° F.

The resulting product is a white plastic composition having utility as a material of construction for shaped articles and the like which are likely to be exposed to ultraviolet light.

Actual stability tests have been performed on various specific embodiments of the white plastic composition of this invention.

In the first series of tests test samples were made from conventional, low density, normally solid polyethylene having a melt index of 2. The samples were made by the procedure described in connection with Examples 1–3 and included the samples formulated as indicated in the following table. In each case the product obtained was compression molded into flat plates 125 mils thick. Test specimens 1.5" x 0.5" were cut from the molded plates, bent int U-shape and while so bent were inserted into ½-inch wide channels. While thus under stress, the test specimens were then exposed to ultraviolet light in a modified Atlas Twin-Arc Weather-Ometer [Anal. Chem., 25, 460 (1953)].

Three test specimens of each sample were employed in this testing and while exposed to ultraviolet light were periodically examined for the presence of cracks visible to the unaided eye. When stress cracks had developed in a specimen, the exposure time of that specimen was determined. The stress crack free life of the sample was then calculated, it being the averaged exposure time required for all three specimens of it to develop stress cracks. The stress crack free life of the samples reported herein are provided in the following table.

Samples 6–8 correspond to the specific embodiments of Examples 1–3.

The data show that in the specific compositions of this invention the titanium dioxide pigment and additives synergistically stabilize polyethyene against the degradative effects of utraviolet light.

In the next series of tests samples were made from crystaline polypropylene having an inherent viscosity of 1.8. The samples were made by the procedure described in connection with Example 4 and included the samples formulated as indicated by the flowing table. The product obtained in each case was granulated and injection molded into ¹⁄₁₆-inch tensil bars 2½ inches long. Three tensile bars of each sample were then mounted under stress in a ⅝-inch wide channel and the channel placed into the modified Atlas Twin-Arc Weather-Ometer. While exposed to ultraviolet light in this apparatus, the stressed tensile bars were periodically inspected for the development of stress cracks visible under 3X magnification (Dazor Floating Fixture Model M-209). When such stress cracks were found to have developed in a specimen, the period of exposure for that specimen was then determined. In such fashion the stress crack free life of the sample was then calculated, it being the averaged exposure times for all three specimens to develop stress cracks. The test data on the samples here reported are summarized in the following table.

| | Sample | | | |
|---|---|---|---|---|
| | 1 | 2 | 3 | 4 |
| Components: [1] | | | | |
| Crystalline polypropylene | 100 | 100 | 100 | 100 |
| Titanium dioxide (anatase) | | 1.5 | | 1.5 |
| p-t-Butylphenol | | | 1.5 | 1.5 |
| Stress Crack Free Life (Hrs.) | 140 | 160 | 212 | 638 |

[1] Concentration in parts by wt.

Sample 4 corresponds to the specific embodiment of Example 4.

From these data it is apparent that titanium dioxide and p-t-butylphenol cooperate to synergistically inhibit ultraviolet light deterioration of normally solid polypropylene.

In the next series of tests samples were made according to the procedure described in connection with Examples 5–12 from a normally solid copolymer of propylene and 1-butene, which had a weight ratio of propylene to 1-butene of 80:20, a density of 0.889 and an inherent viscosity of 2.35. The samples included samples formulated as indicated in the following table. In each case the product obtained upon preparation of the sample was compression molded into flat plates 125 mils thick. Three test specimens 1.5 inches x 0.5 inch were cut from the molded plates of the samples, bent into U-shape and while thus

| | Sample No. | | | | | | | |
|---|---|---|---|---|---|---|---|---|
| | 1 | 2 | 3 | 4 | 5 | 6 | 7 | 8 |
| Components: [1] | | | | | | | | |
| Normally solid polyethylene | 100 | 100 | 100 | 100 | 100 | 100 | 100 | 100 |
| Titanium dioxide (Rutile) | | 5 | | | | 5 | 5 | 5 |
| 4,4'-bis(2,6-di-t-butylphenol) | | | 0.5 | | | 0.5 | | |
| 2,2'-methylenebis[6-(1-methylcyclohexyl)-p-cresol] | | | | 0.5 | | | 0.5 | |
| Zinc N,N-dibutyldithiocarbamate | | | | | 0.5 | | | 0.5 |
| Stress crack free life (Hrs.) | 329 | 160 | 477 | 329 | 342 | 816 | 1,547 | 997 |

[1] Concentration in parts by weight.

stressed were mounted in 0.5-inch wide channels. The channels were then placed into the modified Atlas Twin-Arc Weather-Ometer. Periodically the specimens were inspected for the development of stress cracks visible under 3X magnification. When stress cracks were detected, the total exposure time for the specimen was then calculated. The stress crack free life of each sample is the averaged exposure time required for all three specimens of the sample to develop 3X visible stress cracks. The test results on the samples reported herein are summarized in the following table.

(A) a normally solid polyethylene, and
(B) a synergistic stabilizer combination for stabilizing the polyethylene against degradative effects of ultraviolet light consisting essentially of
  (1) finely divided titanium dioxide at a concentration of about 0.25–10% by weight of said polyethylene, and
  (2) 4,4'-bis(2,6-di-tert. butyl phenol) at a concentration of about 0.1–1.0% by weight of said polyethylene.

4. A normally solid white thermoplastic composition comprising

| Components:[1] | Sample No. | | | | | | | | | | | | | | | | | |
|---|---|---|---|---|---|---|---|---|---|---|---|---|---|---|---|---|---|---|
|  | 1 | 2 | 3 | 4 | 5 | 6 | 7 | 8 | 9 | 10 | 11 | 12 | 13 | 14 | 15 | 16 | 17 | 18 |
| Normally solid copolymer | 100 | 100 | 100 | 100 | 100 | 100 | 100 | 100 | 100 | 100 | 100 | 100 | 100 | 100 | 100 | 100 | 100 | 100 |
| Finely divided titanium dioxide |  | 5 |  |  |  |  |  |  |  |  | 5 | 5 | 5 | 5 | 5 | 5 | 5 | 5 |
| p-t-Butylphenol |  |  | 0.5 | 1.5 |  |  |  |  |  |  | 0.5 | 1.5 |  |  |  |  |  |  |
| 2,2'-methylenebis[6-(1-methylcyclohexyl)-p-cresol] |  |  |  |  | 0.5 |  |  |  |  |  |  |  | 0.5 |  |  |  |  |  |
| Zinc N,N-dibutyldithiocarbamate |  |  |  |  |  | 0.5 |  |  |  |  |  |  |  | 0.5 |  |  |  |  |
| 4,4'-bis(2,6-di-t-butylphenol) |  |  |  |  |  |  | 0.5 |  |  |  |  |  |  |  | 0.5 |  |  |  |
| 4,4'butylidene(6-t-butyl-m-cresol) |  |  |  |  |  |  |  | 0.5 |  |  |  |  |  |  |  | 0.5 |  |  |
| 4,4'-thiobis(6-t-butyl-m-cresol) |  |  |  |  |  |  |  |  | 0.5 |  |  |  |  |  |  |  | 0.5 |  |
| N,N-diphenyl-p-penylenediamine |  |  |  |  |  |  |  |  |  | 0.5 |  |  |  |  |  |  |  | 0.5 |
| Stress crack free life (Hrs.) | 147 | 92 | 140 | 140 | 147 | 238 | 162 | 162 | 185 | 3,183 | 162 | 162 | 421 | 280 | 267 | 238 | 289 | 4,308 |

[1] Concentration in parts by weight.

Samples 11–18 correspond to the specific embodiments of Examples 5–12.

From these data it is evident that the compositions of this invention are synergistically stabilized against the degradative effects of ultraviolet light.

Thus, there is provided a white plastic composition based on titanium dioxide, which composition has outstanding ultraviolet light stability.

These and other features, advantages and specific embodiments of this invention will be readily apparent to those in the exercise of ordinary skill in the art upon reading the foregoing disclosures. In this connection, while specific embodiments have been described in considerable detail, variations and modifications of these embodiments can be effected without departing from the spirit and scope of the invention as disclosed and claimed.

We claim:
1. A normally solid white thermoplastic composition comprising
(A) a normally solid polyethylene, and
(B) a synergistic stabilizer combination for stabilizing the polyethylene against degradative effects of ultraviolet light consisting essentially of
  (1) finely divided titanium dioxide in an amount sufficient to substantially pigment the polyethylene, and
  (2) 0.1–1.0% by weight of said polyethylene of a material selected from the group consisting of 4,4' - bis(2,6-di-tert.butyl phenol), 2,2'-methylene - bis[6-(1-methylcyclohexyl) - p-cresol], and zinc N,N-di($C_1$–$C_{20}$ alkyl) dithiocarbamate.

2. A shaped article from the composition of claim 1.
3. A normally solid white thermoplastic composition comprising (A) a normally solid polyethylene, and
(B) a synergistic stabilizer combination for stabilizing the polyethylene against degradative effects of ultraviolet light consisting essentially of
  (1) finely divided titanium dioxide at a concentration of about 0.25–10% by weight of said polyethylene, and
  (2) 2,2' - methylenebis[6-(1-methylcyclohexyl)-p-cresol] at a concentration of about 0.1–1.0% by weight of said polyethylene.

5. A normally solid white thermoplastic composition comprising
(A) a normally solid polyethylene, and
(B) a synergistic stabilizer combination for stabilizing the polyethylene against degradative effects of ultraviolet light consisting essentially of
  (1) finely divided titanium dioxide at a concentration of about 0.25–10% by weight of said polyethylene, and
  (2) zinc N,N-dibutyl dithiocarbamate at a concentration of about 0.1–1.0% by weight of said polyethylene.

References Cited
UNITED STATES PATENTS

| | | | |
|---|---|---|---|
| 2,964,495 | 12/1960 | Newland et al. | 260—45.75 |
| 2,965,606 | 12/1960 | Ford et al. | 260—45.75 |
| 2,972,596 | 2/1961 | Newland et al. | 260—45.75 |
| 3,182,037 | 5/1965 | Nelson | 260—45.75 |
| 3,325,441 | 6/1967 | McNally et al. | 260—41 |
| 3,100,197 | 8/1963 | Heuck et al. | 260—45.95 |
| 3,282,889 | 11/1966 | Tomlinson | 260—45.95 |

ALLAN LIEBERMAN, *Primary Examiner.*